(12) United States Patent
Lee (10) Patent No.: US 9,806,319 B2
(45) Date of Patent: Oct. 31, 2017

(54) BATTERY MODULE HAVING RING TERMINAL GUIDE

(71) Applicant: LG CHEM, LTD., Seoul (KR)

(72) Inventor: Bum Hyun Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 46 days.

(21) Appl. No.: 14/909,003

(22) PCT Filed: Aug. 21, 2014

(86) PCT No.: PCT/KR2014/007763
§ 371 (c)(1),
(2) Date: Jan. 29, 2016

(87) PCT Pub. No.: WO2015/026173
PCT Pub. Date: Feb. 26, 2015

(65) Prior Publication Data
US 2016/0181586 A1 Jun. 23, 2016

(30) Foreign Application Priority Data

Aug. 23, 2013 (KR) .................. 10-2013-0100173

(51) Int. Cl.
*H01M 2/20* (2006.01)
*H01M 2/30* (2006.01)
(Continued)

(52) U.S. Cl.
CPC .......... *H01M 2/206* (2013.01); *H01M 2/024* (2013.01); *H01M 2/1077* (2013.01); *H01M 2/30* (2013.01);
(Continued)

(58) Field of Classification Search
CPC ...................... H01M 2/206; H01M 10/425
See application file for complete search history.

(56) References Cited

U.S. PATENT DOCUMENTS 7,303,448 B1 * 12/2007 Sproesser ............ H01R 11/282
439/772
2006/0183367 A1 8/2006 Saito et al.
(Continued)

FOREIGN PATENT DOCUMENTS

JP 2006-222043 A 8/2006
JP 2010-176997 A 8/2010
(Continued)

OTHER PUBLICATIONS

International Search Report, issued in PCT/KR2014/007763, dated Jan. 14, 2015.

*Primary Examiner* — Olatunji Godo
(74) *Attorney, Agent, or Firm* — Birch, Stewart, Kolasch & Birch, LLP (57) ABSTRACT

Disclosed herein is a battery module having a plurality of unit cells that can be charged and discharged, the battery module including busbars for electrically interconnecting the unit cells, ring terminals connected to electrical connection portions of the unit cells for measuring voltages of the unit cells, and a busbar mounting member mounted at an outer surface of the battery module corresponding to the electrical connection portions of the unit cells, the busbar mounting member including ring terminal guides for preventing rotation of the ring terminals.

18 Claims, 5 Drawing Sheets (51) Int. Cl.
*H01M 2/10* (2006.01)
*H01M 10/42* (2006.01)
*H01M 10/48* (2006.01)
*H01M 2/02* (2006.01)

(52) U.S. Cl.
CPC ......... *H01M 10/425* (2013.01); *H01M 10/48* (2013.01); *H01M 2010/4271* (2013.01); *H01M 2220/10* (2013.01); *H01M 2220/20* (2013.01)

(56) References Cited

U.S. PATENT DOCUMENTS

| | | | |
|---|---|---|---|
| 2010/0021802 A1* | 1/2010 | Yang | H01M 2/0212 |
| | | | 429/91 |
| 2010/0190050 A1 | 7/2010 | Ochi | |
| 2012/0068668 A1* | 3/2012 | Kittell | B60L 11/185 |
| | | | 320/162 |
| 2014/0329136 A1 | 11/2014 | Kinoshita et al. | |
| 2015/0024634 A1 | 1/2015 | Nakayama | |

FOREIGN PATENT DOCUMENTS

| | | |
|---|---|---|
| JP | 2012-248511 A | 12/2012 |
| JP | 2013-105572 A | 5/2013 |
| KR | 10-2013-0017129 A | 2/2013 |
| WO | WO 2013/105435 A1 | 7/2013 |

* cited by examiner

BATTERY MODULE HAVING RING TERMINAL GUIDE

TECHNICAL FIELD

The present invention relates to a battery module having ring terminal guides.

BACKGROUND ART

In recent years, a secondary battery, which can be charged and discharged, has been widely used as an energy source for wireless mobile devices. In addition, the secondary battery has attracted considerable attention as a power source for electric vehicles (EV), hybrid electric vehicles (HEV), and plug-in hybrid electric vehicles (Plug-in HEV), which have been developed to solve problems, such as air pollution, caused by existing gasoline and diesel vehicles using fossil fuels.

In addition, technology related to a power storage apparatus that stores electric power and stably supplies the stored electric power to a power system when needed has been developed. The power storage apparatus is an apparatus that stores electric power when power demand is low and supplies the stored electric power in case of overload or emergency. The power storage apparatus provides the effect of improving quality of electric power and energy efficiency. In particular, a market for a household power storage apparatus and a middle-sized industrial or commercial power storage apparatus has been rapidly expanding as the power storage apparatuses are related to smart grid technology.

Meanwhile, for a battery module to provide output and capacity required by a predetermined apparatus or device, it is necessary for the battery module to be configured to have a structure in which a plurality of battery cells is electrically connected to each other in series or in parallel. In addition, it is necessary for the battery module to be configured to have a structure which is easily extendable and stable as the capacity of the battery module is increased.

Particularly, in a case in which a plurality of battery cells is used to constitute a battery module, overvoltage may be applied to some of the battery cells, overcurrent may flow in some of the battery cells, or some of the battery cells may overheat, with the result that safety and operation efficiency of the battery module may be seriously concerned. For this reason, it is necessary to provide a means for detecting such overvoltage, overcurrent, or the overheating to control the battery module. Consequently, the battery module includes a safety system, such as a battery management system (BMS), which detects such overvoltage, overcurrent, or the overheating to control and protect the battery module.

Ring terminals are connected to electrode terminals of the battery cells such that the BMS measures voltage. A process of connecting the ring terminals to electrode terminals of the battery cells is performed together with a process of connecting the battery cells in series or parallel to each other using busbars. In the processes, the ring terminals may be cut or damaged due to the rotation of the ring terminals when the busbars and the ring terminals are fastened to the electrode terminals of the battery cells using bolts since the ring terminals are not fixed but easily rotate.

Therefore, there is a high necessity for technology that is capable of fundamentally solving the above problems.

DISCLOSURE

Technical Problem

The present invention has been made to solve the above problems, and other technical problems that have yet to be resolved.

It is an object of the present invention to provide a battery module configured to have a structure in which damage to ring terminals due to the rotation of the ring terminals is prevented in a process of connecting busbars and the ring terminals to electrode terminals of battery cells, whereby a defect rate of the battery module is reduced, and the safety of the battery module is improved.

Technical Solution

In accordance with one aspect of the present invention, the above and other objects can be accomplished by the provision of a battery module having a plurality of unit cells that can be charged and discharged, the battery module including busbars for electrically interconnecting the unit cells, ring terminals connected to electrical connection portions of the unit cells for measuring voltages of the unit cells, and a busbar mounting member mounted at an outer surface of the battery module corresponding to the electrical connection portions of the unit cells, the busbar mounting member including ring terminal guides for preventing rotation of the ring terminals.

That is, the battery module according to the present invention includes the busbar mounting member having the ring terminal guides for preventing the rotation of the ring terminals. In a process of connecting the busbars and the ring terminals to electrode terminals, therefore, damage to the ring terminals due to the rotation of the ring terminals is prevented, thereby reducing a defect rate and improving safety.

In a concrete example, each of the unit cells may be a plate-shaped battery cell, or may be configured to have a structure in which two or more plate-shaped battery cells are mounted in a cell cover in a state in which electrode terminals are exposed.

For example, the plate-shaped battery cell may be a pouch-shaped battery cell configured to have a structure in which an electrode assembly is mounted in a battery case made of a laminate sheet including a metal layer and a resin layer.

The battery cell is not particularly restricted so long as the battery cell is capable of providing high voltage and high current when a battery module or a battery pack is manufactured using the battery cell. For example, the battery cell may be a lithium secondary battery having a large amount of energy storage per volume.

In another example of each of the unit cells, the cell cover may include a pair of sheathing members coupled to each other for covering outer surfaces of the battery cells excluding the electrode terminals. For example, two battery cells may be mounted in the cell cover, and the two battery cells may be stacked in the cell cover such that electrode tabs having the same polarities are connected in parallel to each other while being adjacent to each other.

The unit cells each may have electrode terminals formed at one side thereof, and may be arranged such that a plurality of pairs of unit cells is vertically arranged in a height direction from a ground, in a state in which each pair of unit cells is arranged on a plane such that the electrode terminals are opposite to each other, to constitute a unit cell stack.

In addition, a battery management system (BMS) for controlling the operation of the battery module may be mounted at one side of the unit cell stack, and the ring terminals may be electrically connected to the BMS. Consequently, it is possible to measure voltages from the unit cells.

Each pair of unit cells that are arranged on the plane may be connected in parallel to each other, and the unit cells that are arranged vertically may be connected in series to each other. The ring terminals may be connected to series connection portions of the unit cells.

The busbar mounting member may be provided with busbar mounting recesses, each of which has a shape corresponding to that of a corresponding one of the busbars. The busbars may be mounted and fixed in the respective busbar mounting recesses such that disconnection between the unit cells and the busbars due to external impact is prevented.

In addition, the busbar mounting member may be configured to have a rectangular structure, and a side wall may be formed along the outer edge of the busbar mounting member in a protruding state.

One end of each of the electrode terminals may be bent upward or downward such that the bent end of each of the electrode terminals is connected to a corresponding one of the busbars. That is, the electrode terminals may be bent toward the busbar mounting member such that the unit cells which are arranged vertically can be connected in series to each other via the busbars.

Coupling holes may be formed at the bent ends of the electrode terminals and opposite ends of the busbars, and bolts, bolts-nuts, or clinching nuts may be electrically and mechanically fastened to the coupling holes. Consequently, one of the unit cells that are arranged vertically may be connected to one end of a corresponding one of the busbars, and another unit cell may be connected to the other end of a corresponding one of the busbars.

The ring terminals may be coupled respectively between the busbars and the bolts, between the busbars and the bolts-nuts, or between the busbars and the clinching nuts. When the bolts, the bolts-nuts, or the clinching nuts are rotated so as to fasten the busbars and the ring terminals to the electrode terminals, therefore, the ring terminals may also rotate with the result that the ring terminals may be cut or damaged. According to the present invention, however, the ring terminal guides are formed at the busbar mounting member, and therefore, the rotation of the ring terminals is prevented by the ring terminal guides.

Specifically, each of the ring terminals may include a terminal end coupled to a corresponding one of the series connection portions of the unit cells and a terminal wire connected to the terminal end, and each of the ring terminal guides may fix the terminal wire at a correct position for restraining the rotation of the terminal end.

Each of the ring terminal guides may be configured to have a protruding structure for supporting one side or opposite sides of the terminal wire.

Each of the ring terminal guides may be configured to have a protruding structure for supporting one side of the terminal wire that restrains the rotation of the terminal end in a clockwise direction. Alternatively, each of the ring terminal guides may be configured to have a structure for restraining the rotation of the terminal end in a counterclockwise direction. In addition, each of the ring terminal guides may be configured to have a structure for restraining the rotation of the terminal end in both the clockwise direction and the counterclockwise direction.

Each of the ring terminal guides may have a length equivalent to 35% to 65% a total length of the terminal end and the terminal wire of a corresponding one of the ring terminals located on the busbar mounting member. If the length of each of the ring terminal guides is less than 35% the total length of the terminal end and the terminal wire of a corresponding one of the ring terminals located on the busbar mounting member, it is not possible to sufficiently restrain the rotation of the ring terminals. On the other hand, if the length of each of the ring terminal guides is greater than 65% the total length of the terminal end and the terminal wire of a corresponding one of the ring terminals located on the busbar mounting member, the area occupied by the ring terminal guides on the busbar mounting member becomes large with the result that it is difficult to arrange the busbars and the ring terminals. For these reasons, each of the ring terminal guides may have a length equivalent to 35% to 65%, more specifically 45% to 55%, the total length of the terminal end and the terminal wire of a corresponding one of the ring terminals located on the busbar mounting member.

The busbar mounting member may further include a hook for fixing the terminal wire. The hook may be formed at the one end of each of the ring terminal guides such that the hook protrudes upward therefrom.

In accordance with another aspect of the present invention, there is provided a battery pack including the battery module with the above-stated construction as a unit module.

The battery pack may be manufactured by combining battery modules as unit modules according to desired output and capacity. In consideration of installation efficiency and structural stability, the battery pack may be used as a power source for a household power supply, a power supply for public facilities, a power supply for large-sized stores, a power supply for emergency, a power supply for computer rooms, a portable power supply, a power supply for medical facilities, a power supply for fire extinguishing facilities, a power supply for alarm facilities, a power supply for refuge facilities, an electric vehicle, a hybrid electric vehicle, or a plug-in hybrid electric vehicle. However, the present invention is not limited thereto.

In accordance with a further aspect of the present invention, there is provided a device including the battery pack as a power source. Specifically, the device may be a household power supply, a power supply for public facilities, a power supply for large-sized stores, a power supply for emergency, a power supply for computer rooms, a portable power supply, a power supply for medical facilities, a power supply for fire extinguishing facilities, a power supply for alarm facilities, a power supply for refuge facilities, an electric vehicle, a hybrid electric vehicle, or a plug-in hybrid electric vehicle.

The structure and manufacturing method of the device are well known in the art to which the present invention pertains, and therefore a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which.

BEST MODE

Now, exemplary embodiments of the present invention will be described in detail with reference to the accompanying drawings. It should be noted, however, that the scope of the present invention is not limited by the illustrated embodiments.

Figure 1:
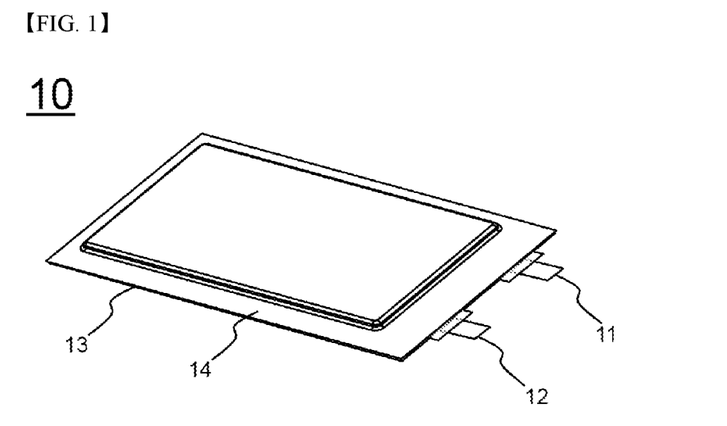
FIG. 1 is a perspective view showing a battery cell constituting a unit cell of a battery module according to the present invention.
Figure 2:
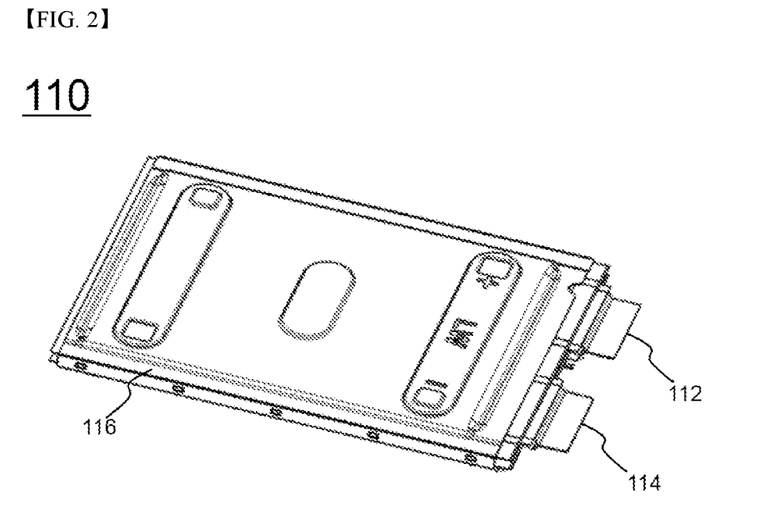
FIG. 2 is a perspective view showing a unit cell constituted by battery cells, one of which is shown FIG. 1.

FIG. 1 is a perspective view showing a battery cell constituting a unit cell of a battery module according to the present invention, and FIG. 2 is a perspective view showing a unit cell constituted by battery cells, one of which is shown FIG. 1.

Referring to FIGS. 1 and 2, a battery cell 10 is configured to have a structure in which an electrode assembly (not shown) is received in a battery case 13 made of a laminate sheet together with an electrolyte (not shown), and an outer edge 14 of the battery case is sealed. Electrode tabs 11 and 12 are formed at one side of the battery case 13.

A unit cell 110 is configured to have a structure in which two plate-shaped battery cells 10 are mounted in a cell cover 116 in a state in which electrode terminals 112 and 114 are exposed from one side of the cell cover 116. The cell cover 116 of the unit cell includes a pair of sheathing members coupled to each other for covering outer surfaces of the battery cells 10 excluding the electrode terminals 112 and 114. The battery cells 10 are stacked in the cell cover 116 such that electrode tabs 11 and 12 having the same polarities are connected in parallel to each other while being adjacent to each other.

Figure 3:
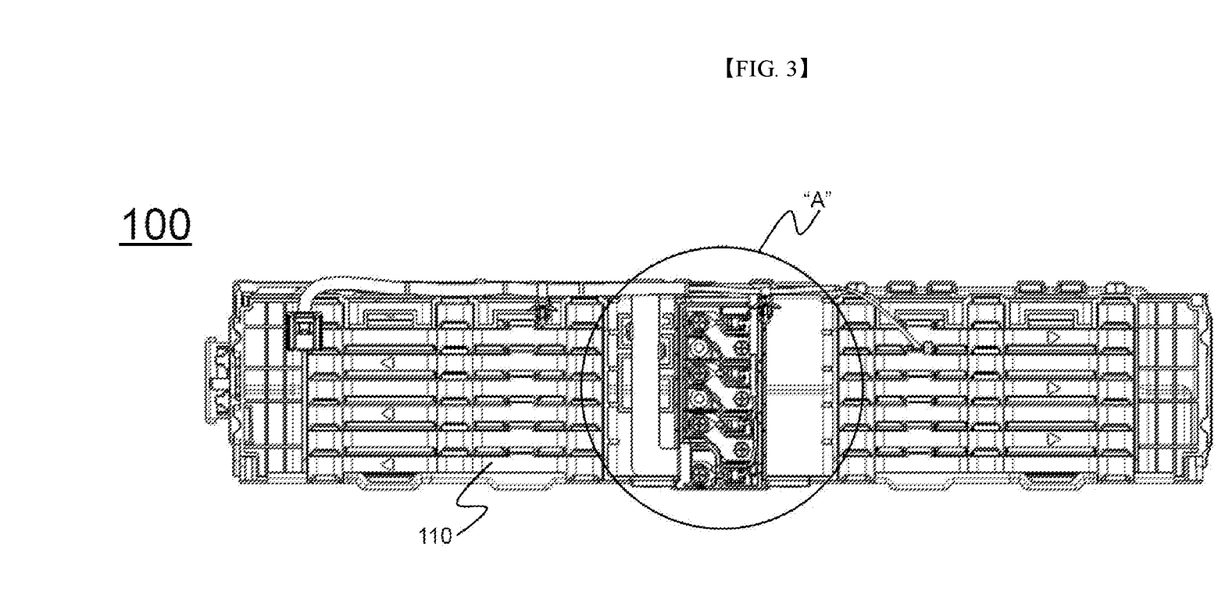
FIG. 3 is a side view showing a battery module according to an embodiment of the present invention.
Figure 4:
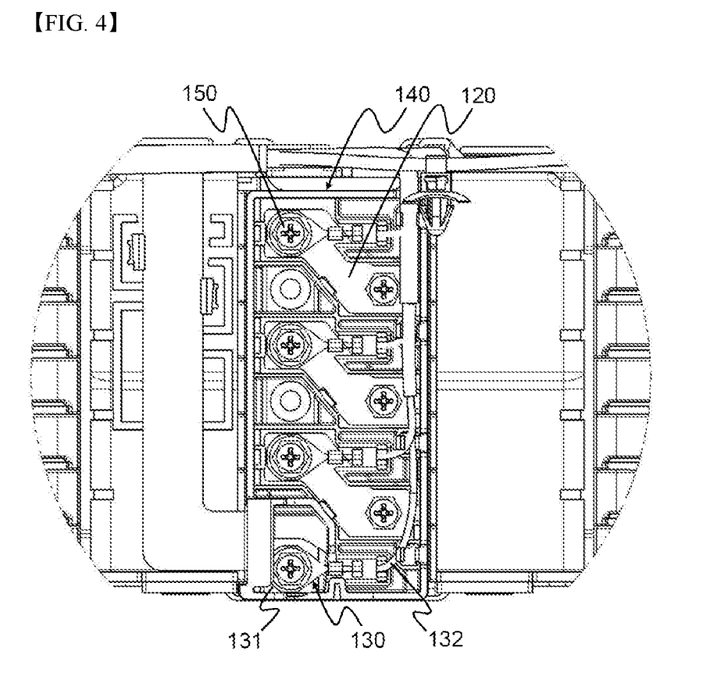
FIG. 4 is an enlarged view showing portion A of FIG. 3.
Figure 5:
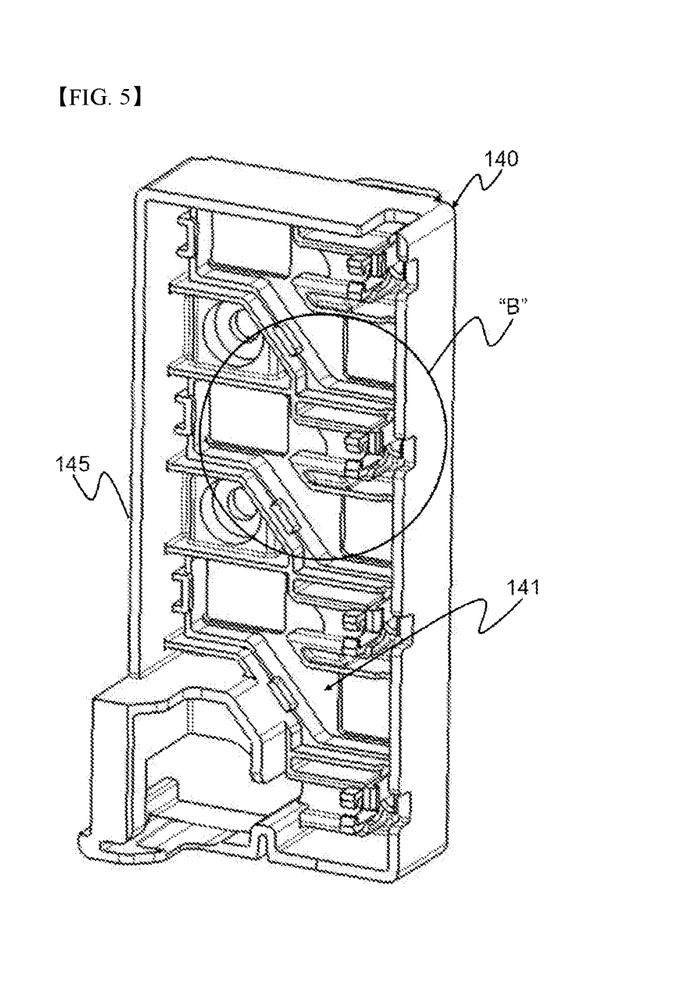
FIG. 5 is a typical view showing a busbar mounting member of FIG. 3.
Figure 6:
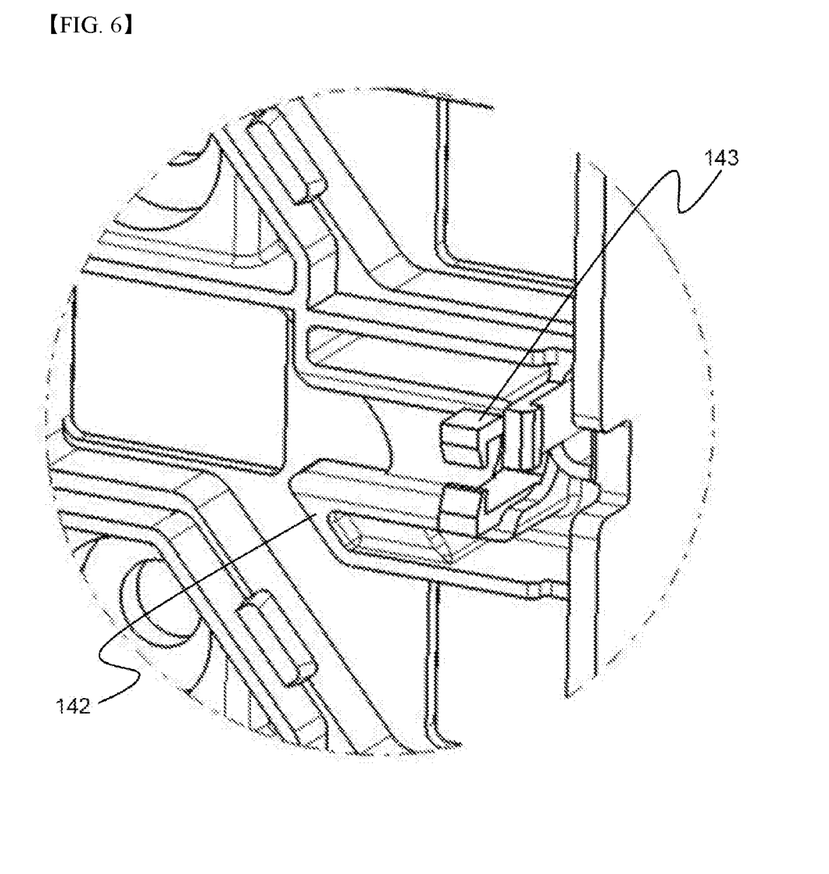
FIG. 6 is an enlarged view showing portion B of FIG. 5.

FIG. 3 is a side view showing a battery module according to an embodiment of the present invention, FIG. 4 is an enlarged view showing portion A of FIG. 3, FIG. 5 is a typical view showing a busbar mounting member of FIG. 3, and FIG. 6 is an enlarged view showing portion B of FIG. 5.

Referring to FIGS. 3 to 6 together with FIG. 2, a battery module 100 includes a plurality of unit cells 110, busbars 120, ring terminals 130, a busbar mounting member 140, and a battery management system (BMS) (not shown).

The unit cells 110 are arranged such that a plurality of pairs of unit cells 110 is vertically arranged in a height direction from the ground, in a state in which each pair of unit cells 110 is arranged on a plane such that electrode terminals 112 and 114 are opposite to each other, to constitute a unit cell stack.

The unit cells 110 that are connected to each other on the plane are connected in parallel to each other, and the unit cells 110 that are arranged vertically are connected in series to each other.

The busbar mounting member 140 is mounted at a portion of the battery module corresponding to a portion at which the electrode terminals 112 and 114 of the unit cells 110 are connected.

The busbar mounting member 140 is configured to have a rectangular structure. A side wall 145 is formed along the outer edge of the busbar mounting member 140 in a protruding state.

In the busbar mounting member 140 are formed busbar mounting recesses 141, each of which has a shape corresponding to that of a corresponding one of the busbars 120. At the right side of each of the busbar mounting recesses 141 is formed a ring terminal guide 142 for preventing rotation of a corresponding one of the ring terminals 130.

Ends of the electrode terminals 112 and 114 of the unit cells 110 toward the busbar mounting member 140 are bent. Coupling holes (not shown) are formed at the bent ends of the electrode terminals 112 and 114 and opposite ends of the busbars 120.

The coupling holes of the electrode terminals 112 and 114 and the busbars 120 are electrically and mechanically fastened to each other by bolts 150. The ring terminals 130 are coupled respectively between the busbars 120 and the bolts 150.

Each of the ring terminals 130 includes a terminal end 131 and a terminal wire 132. The busbar mounting member 140 is further provided at the upper end of a right end portion of each of the ring terminal guides 142 thereof with a hook 143 for fixing the terminal wire 132.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a battery module according to the present invention includes a busbar mounting member having ring terminal guides for preventing the rotation of ring terminals. In a process of connecting busbars and the ring terminals to electrode terminals, therefore, damage to the ring terminals due to the rotation of the ring terminals is prevented, thereby reducing a defect rate and improving safety.

The invention claimed is:

1. A battery module having a plurality of unit cells that can be charged and discharged, the battery module comprising:
    busbars for electrically interconnecting the unit cells;
    ring terminals connected to electrical connection portions of the unit cells for measuring voltages of the unit cells; and
    a busbar mounting member mounted at an outer surface of the battery module corresponding to the electrical connection portions of the unit cells, the busbar mounting member comprising ring terminal guides for preventing rotation of the ring terminals,
    wherein each of the ring terminals comprises a terminal end coupled to a corresponding one of series connection portions of the unit cells and a terminal wire connected to the terminal end, and each of the ring terminal guides fixes the terminal wire at a correct position for restraining rotation of the terminal end,
    wherein each of the ring terminal guides is configured to have a protruding structure for supporting one side or opposite sides of the terminal wire,
    wherein the busbar mounting member further includes a hook for fixing the terminal wire, and
    wherein the hook is formed at the one end of each of the ring terminal guides such that the hook protrudes upward therefrom.

2. The battery module according to claim 1, wherein each of the unit cells is a single plate-shaped battery cell, or is configured to have a structure in which two or more plate-shaped battery cells are mounted in a cell cover in a state in which electrode terminals are exposed.

3. The battery module according to claim 2, wherein the plate-shaped battery cell is configured to have a structure in which an electrode assembly is mounted in a battery case made of a laminate sheet comprising a metal layer and a resin layer, and an outer edge of the battery case is sealed.

4. The battery module according to claim 2, wherein the plate-shaped battery cell is a lithium secondary battery.

5. The battery module according to claim 2, wherein the cell cover comprises a pair of sheathing members coupled to each other for covering outer surfaces of the battery cells excluding the electrode terminals.

6. The battery module according to claim 1, wherein
the unit cells each have electrode terminals formed at one side thereof, and are arranged such that a plurality of pairs of unit cells is vertically arranged in a height direction from a ground, in a state in which each pair of unit cells is arranged on a plane such that the electrode terminals are opposite to each other, to constitute a unit cell stack,
a battery management system (BMS) is mounted at one side of the unit cell stack, and
the ring terminals are electrically connected to the BMS.

7. The battery module according to claim 6, wherein
each pair of unit cells that are arranged on the plane are connected in parallel to each other, and the unit cells that are arranged vertically are connected in series to each other, and
the ring terminals are connected to series connection portions of the unit cells.

8. The battery module according to claim 1, wherein the busbar mounting member is provided with busbar mounting recesses, each of which has a shape corresponding to that of a corresponding one of the busbars.

9. The battery module according to claim 1, wherein the busbar mounting member is configured to have a rectangular structure, and a side wall is formed along an outer edge of the busbar mounting member in a protruding state.

10. The battery module according to claim 1, wherein one end of each of the electrode terminals is bent upward or downward such that the bent end of each of the electrode terminals is connected to a corresponding one of the busbars.

11. The battery module according to claim 10, wherein coupling holes are formed at the bent ends of the electrode terminals and opposite ends of the busbars, and bolts, bolts-nuts, or clinching nuts are electrically and mechanically fastened to the coupling holes.

12. The battery module according to claim 1, wherein each of the ring terminal guides is configured to have a protruding structure for supporting one side or opposite sides of the terminal wire.

13. The battery module according to claim 1, wherein each of the ring terminal guides is configured to have a protruding structure for supporting one side of the terminal wire that restrains rotation of the terminal end in a clockwise direction.

14. The battery module according to claim 1, wherein each of the ring terminal guides has a length equivalent to 35% to 65% a total length of the terminal end and the terminal wire of a corresponding one of the ring terminals located on the busbar mounting member.

15. The battery module according to claim 1, wherein each of the ring terminal guides has a length equivalent to 45% to 55% a total length of the terminal end and the terminal wire of a corresponding one of the ring terminals located on the busbar mounting member.

16. A battery pack comprising a battery module according to claim 1 as a unit module.

17. A device comprising a battery pack according to claim 16.

18. The device according to claim 17, wherein the device is a household power supply, a power supply for public facilities, a power supply for large-sized stores, a power supply for emergency, a power supply for computer rooms, a portable power supply, a power supply for medical facilities, a power supply for fire extinguishing facilities, a power supply for alarm facilities, a power supply for refuge facilities, an electric vehicle, a hybrid electric vehicle, or a plug-in hybrid electric vehicle.

* * * * *